United States Patent [19]

Lewis et al.

[11] Patent Number: 5,281,343
[45] Date of Patent: Jan. 25, 1994

[54] VACUUM FILTRATION SYSTEM AND METHOD OF FILTERING PULP FIBERS FROM PULP SLURRY USING THE SAME

[75] Inventors: Frederick S. Lewis, Nashua; Lewis F. Empie, Amherst; Rollin E. Brown, Nashua, all of N.H.

[73] Assignee: Ingersoll-Rand Company, Woodcliff Lake, N.J.

[21] Appl. No.: 48,222

[22] Filed: Apr. 20, 1993

[51] Int. Cl.$^5$ .............................................. B01D 33/09
[52] U.S. Cl. ................................... 210/784; 162/368; 210/403; 210/404
[58] Field of Search ..................... 162/363, 367–371, 162/321, 53, 217, 279, 318, 319–321, 328, 329, 357, 784, 161, 402–404, 416.1; 210/784, 403, 404

[56] References Cited

U.S. PATENT DOCUMENTS

| | | |
|---|---|---|
| 811,660 | 2/1906 | Parker . |
| 923,870 | 6/1909 | Meader . |
| 1,536,610 | 5/1925 | Burnham . |
| 2,899,068 | 8/1959 | King et al. ........................ 210/402 |
| 3,363,774 | 4/1965 | Luthi ................................. 210/404 |
| 3,680,708 | 8/1972 | Luthi ................................. 210/404 |
| 3,837,499 | 9/1974 | Luthi ................................. 210/404 |

OTHER PUBLICATIONS

Paper, "Dewatering and Washing of Pulps" by J. P. Rich.

Primary Examiner—Frank Sever
Attorney, Agent, or Firm—Robert F. Palermo; Thomas J. Perkowski; James R. Bell

[57] ABSTRACT

A method and apparatus for filtering pulp fibers from a pulp slurry, using a combination of vacuum, hydrodynamic and hydrostatic forces in order to achieve a more effective deposition of pulp fibers onto the filter surface and enhanced flow of filtrate through the cylinder. The apparatus is in the form of an improved vacuum filtration system, in which the filtrate outlet tube is disposed along the axis of rotation of the rotary cylinder and the filtrate inlet and outlet ports of each filtrate conduct are radially offset from one another in the direction of intended rotation of the cylinder. During various phases of filter operation, vacuum forces generated by the vacuum source cooperate with either hydrodynamically or hydrostatically generated forces, which together act upon columns of filtrate in the filtrate conduits as the cylinder rotates.

14 Claims, 6 Drawing Sheets

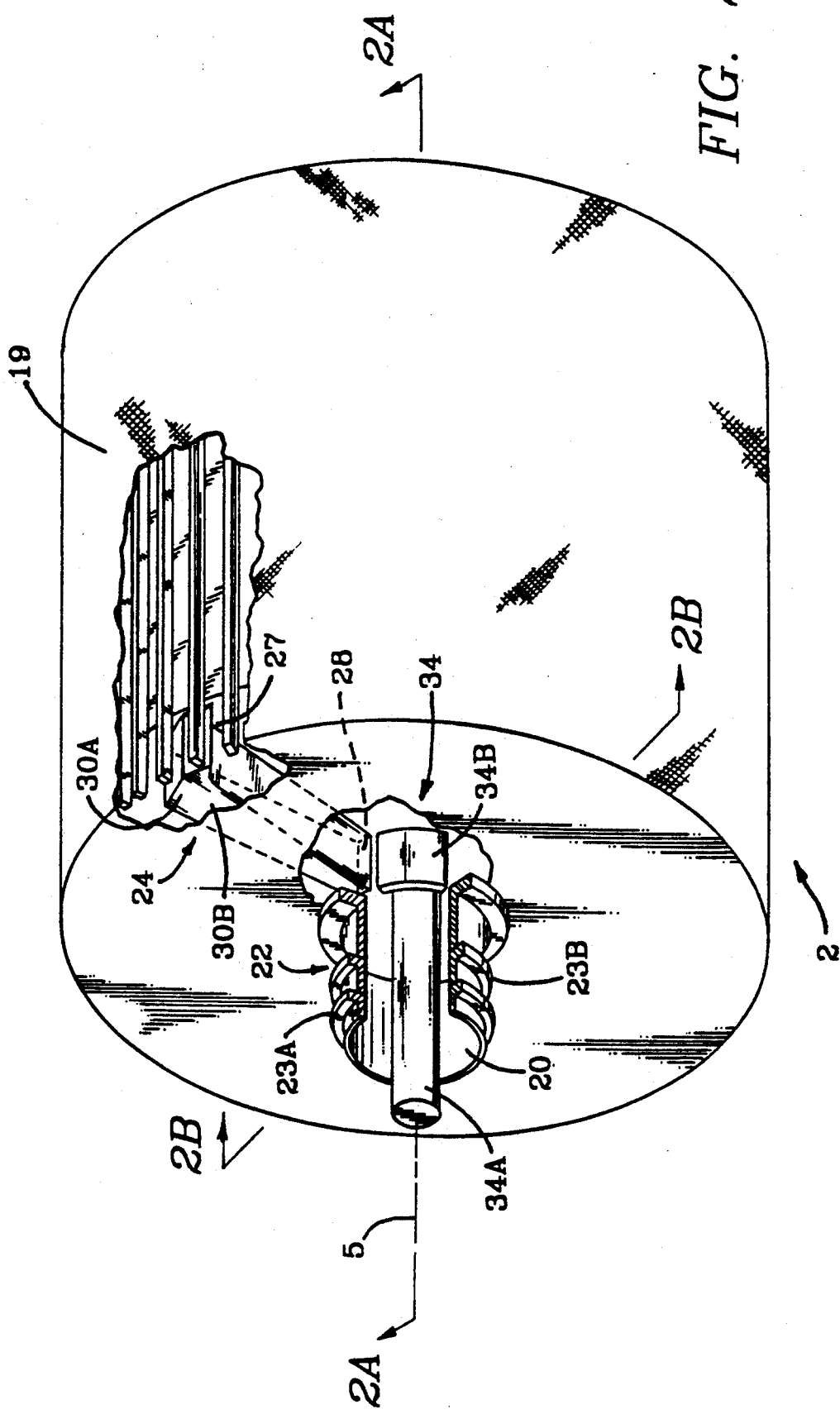

VACUUM FILTRATION SYSTEM AND METHOD OF FILTERING PULP FIBERS FROM PULP SLURRY USING THE SAME

BACKGROUND OF THE INVENTION

The present invention relates generally to improved method and apparatus for filtering solids from liquid suspensions, and more particularly relates to a vacuum filtration system which achieves improved filtering of pulp fibers from pulp slurry during the continuous formation of pulp sheets.

There are a variety of industrial and manufacturing processes which require filtering of dispersed solids from liquid suspensions. Such filtering functions are of particular importance in the manufacture of paper, paperboard, and felt.

In the manufacture of paper and paperboard products, wood is broken into chips which are then digested and bleached to provide a pulp slurry. The pulp fibers in this slurry are dispersed, typically in water, and often in the presence of additives in order to improve the paper manufacturing process or the characteristics of the paper product. Examples of such additives include drying agents, wet and/or dry strength enhancers, antistatic agents, and the like. Typically, the pulp slurry is highly diluted, for example, about 4% solids, and thus is often called "dilute stock." The pulp solids are removed from the pulp slurry by filtering the liquid portion of the slurry (i.e. the filtrate) through a screen or similar filter device to produce a wet sheet of pulp that is deposited on the surface of the filter. While deposited on the filter surface, the wet pulp sheet can be washed using water in order to remove the various additives. The pulp sheet is then removed from the filter surface for further drying and subsequent processing into a final paper product. Similar processing techniques are used in the manufacture of felt and like articles.

One method for filtering pulp fibers from pulp slurry involves the use of a cylinder drum disposed horizontally and partially submersed in a tank containing a desired amount of pulp slurry. The cylindrical wall of the drum supports a filtering surface, often made from a metallic screen material, on which the pulp collects and forms a wet pulp sheet as the drum is rotated. The pulp sheet is removed continuously from the rotating filter surface by a take-off device and, in some applications, the wet pulp sheet may be squeezed between the filter surface and a roller to remove additional filtrate prior to removing the pulp sheet from the cylinder drum. Within the interior of the cylinder drum, a series of filtrate passages are provided for the purpose of collecting filtrate from filtrate inlet ports which extend longitudinally along the filter surface. Filtrate passing through each filtrate inlet port is directed along a filtrate passage to either the center or the end of the drum, from where it is removed. To minimize environmental impact, the collected filtrate is typically recycled and used in the preparation of fresh pulp slurry and/or clean water for pulp washing operations. Hitherto, two principally different methods have been used to create a pressure differential at the filter surface in order to conduct filtrate across the filter surface and thereby deposit pulp fibers on the filter surface.

The first method, which was more popular in earlier times than at present, uses only the force of gravity to induce the flow of filtrate across the filter surface and deposit pulp fibers thereon. This method, known as "beater washing", involves the use of a "beater washer". In general, the "beater washer" cylinder is lowered into the flow of dilute stock and is then rotated by external gearing. Typically, the outside surface of the cylinder is covered with above 60 or 80 mesh (per inch) wire. As the cylinder rotates, the hydraulic pressure differential (i.e. head) created across the outside surface of the cylinder causes the dilute stock to flow into the cylinder, depositing pulp fibers on the outside of the screen. The major drawbacks to this method are that pulp washing is quite slow and uses water inefficiently.

The second and more popular method of creating a pressure differential across the filter surface involves the use of a "vacuum washer". In general, the vacuum washer includes a cylinder which is rotated about its axle within a tank of pulp slurry. Typically, the rotary cylinder contains a series of filtrate conduits or compartments within the interior of the cylinder. Each of these filtrate conduits has a filtrate inlet port which extends along the longitudinal length of the cylinder, and a filtrate outlet port which is connected to a filtrate outlet tube. This tube rotates about a stationary vacuum tube that is connected to a vacuum or suction pump. In general, the portion of each filtrate conduit extending from the filtrate inlet port to its associated filtrate outlet port is rectilinear and the filtrate inlet and outlet ports are radially aligned. Disposed over the filtrate inlet ports is a filter surface, typically constructed from wire and mesh screening. In order that only a selected number of filtrate conduits, are connected to the vacuum source at a time, the vacuum tube has a control valve. As the cylinder rotates with the vacuum pump activated, there is always a first stationary region over the filter surface where vacuum pressure is present and a second stationary region over the filter surface where vacuum pressure is absent. The second stationary region is located where the pulp sheet is to be removed, whereas the first stationary region is located where filtrate flow is to be induced for purposes of achieving pulp fiber deposition dewatering and filtrate removal operations.

While prior art vacuum washers have performed a number of important functions, they have, however, suffered from a several significant shortcomings and drawbacks.

Specifically, the pressure differential required to induce filtrate flow across the filter surface of prior art vacuum washers has been provided primarily by vacuum forces created by an associated vacuum pump. In addition, the column of filtrate contained within each filtrate conduit disposed below the pulp slurry level in the vessel, presents a negative hydrostatic pressure or head which the vacuum forces of the vacuum pump must overcome in order to suction filtrate through the filter surface. Consequently, filtrate conduits which contain columns of filtrate that are highly aligned with the gravitational force field, are subjected to the greatest amount of negative hydrostatic pressure, substantially decreasing the effective vacuum forces of the vacuum pump along these filtrate conduits and during vacuum start-up operations.

Moreover, as the wet pulp sheet on the filter surface is sprayed with water during washing operations, the pressure drop presented by the pulp sheet itself reduces the efficacy of vacuum pressure supplied to the filter surface during subsequent dewatering operations.

The foregoing illustrates limitations known to exist in present vacuum filtration systems and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a cylindrical structure having an interior volume and a longitudinal axis and being supportable within a vessel, for rotation about the longitudinal axis in a predetermined rotational direction. The vessel contains a selected level of liquid suspension having solids dispersed in liquid filtrate. The cylinder structure comprises a filter surface pervious to the filtrate and substantially impervious to the dispersed solids; a filtrate outlet tube disposed along the longitudinal axis; and a plurality of filtrate conduits, each filtrate conduit having first and second conduit portions, each first conduit portion having a filtrate inlet port extending beneath and along a portion of the filter surface in a direction substantially parallel to the longitudinal axis, and each second conduit portion being operably connected with the first conduit portion and having a filtrate outlet port operably connected to the filtrate outlet tube, and the filtrate outlet port of each filtrate conduit being radially offset from the associated filtrate inlet port in the predetermined rotational direction so that, as the cylinder structure rotates in the predetermined rotational direction and a vacuum source is operably connected to the filtrate outlet tube, filtrate from the vessel is suctioned through the filter surface and along at least a selected number of the filtrate conduits and then through the filtrate outlet port, and dispersed solids are suctioned against the filter surface to form a sheet of the dispersed solids on the filter surface.

Another aspect of the present invention provides a method of filtering pulp fibers from a liquid filtrate contained in pulp slurry. The method comprises the steps of: installing a stationary vacuum tube along a reference axis; connecting an activatable vacuum source to the stationary vacuum tube; supporting a cylindrical structure within at least a portion of a vessel, for rotation in predetermined rotational direction about the reference axis, the cylinder structure having an interior volume and further including a filter surface pervious to the filtrate and substantially impervious to the pulp fibers, a filtrate outlet tube disposed along the longitudinal axis, and a plurality of filtrate conduits, each filtrate conduit having first and second conduit portions, each first conduit portion having a filtrate inlet port extending beneath and along a portion of the filter surface in a direction substantially parallel to the longitudinal axis, and each second conduit portion being operably connected with the first conduit portion and having a filtrate outlet port operably connected to the filtrate outlet tube, and the filtrate outlet port of each filtrate conduit being radially offset from the associated filtrate inlet port in the predetermined rotational direction; maintaining a desired volume of pulp slurry in the vessel so that the pulp slurry fills the vessel up to a selected level; and activating the vacuum source and rotating the cylindrical structure about the reference axis in the predetermined rotational direction, whereby filtrate from the vessel is suctioned through the filter surface and along at least a selected number of the filtrate conduits and then through the vacuum outlet port, and pulp fibers are suctioned against the filter surface to form a sheet of the dispersed solids on the filter surface.

The foregoing and other aspects will become apparent from the following detailed description of the invention when considered in conjunction with the accompanying drawing figures.

BRIEF DESCRIPTION OF THE DRAWING FIGURES

FIG. 2 is a perspective view of a first illustrative embodiment of a cylinder structure used in the vacuum filtration system of the present invention;

Figure 1:
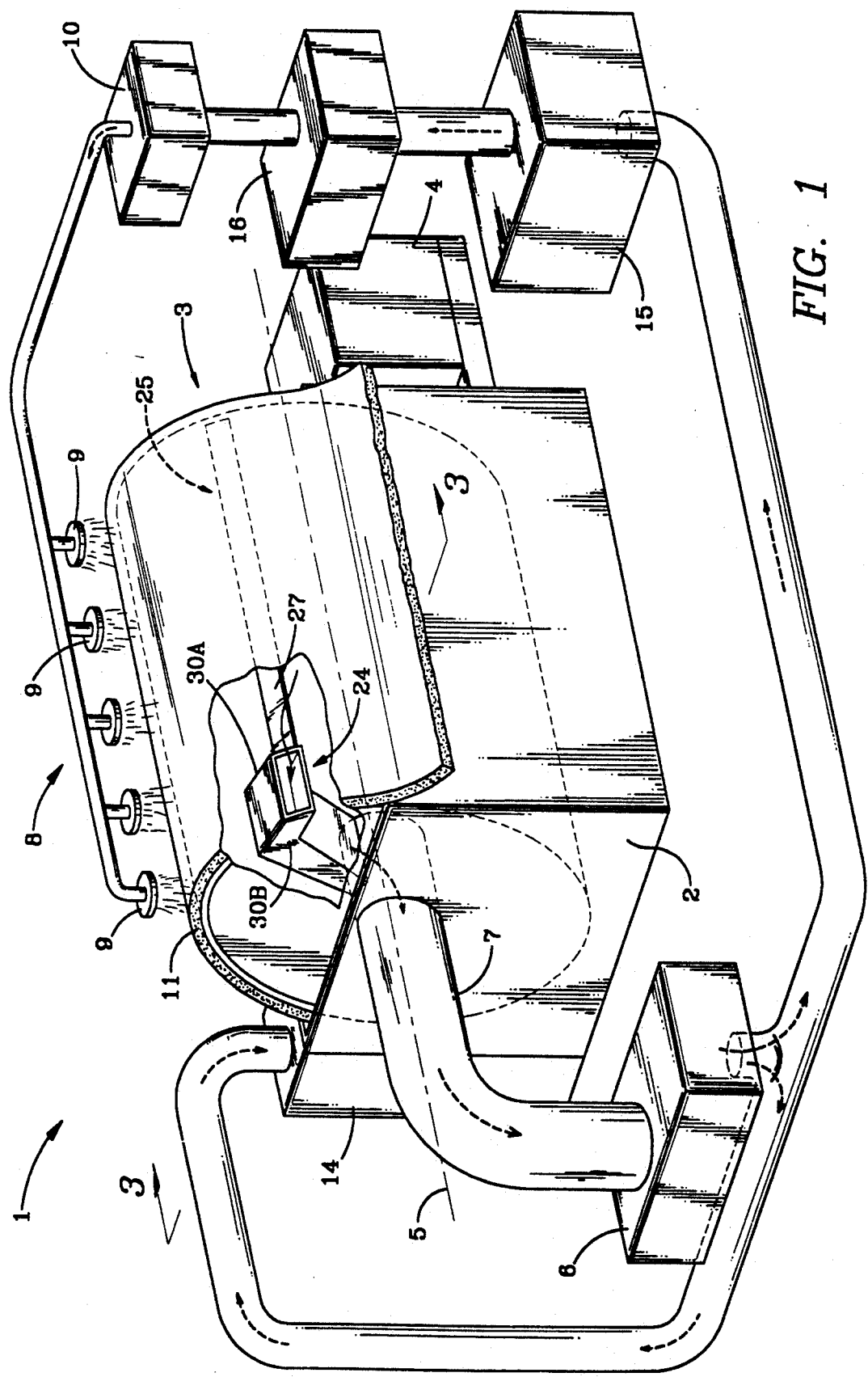
FIG. 1 is a perspective view of an embodiment of a vacuum filtration system constructed in accordance with the principles of the present invention.
Figures 2A, 2B:
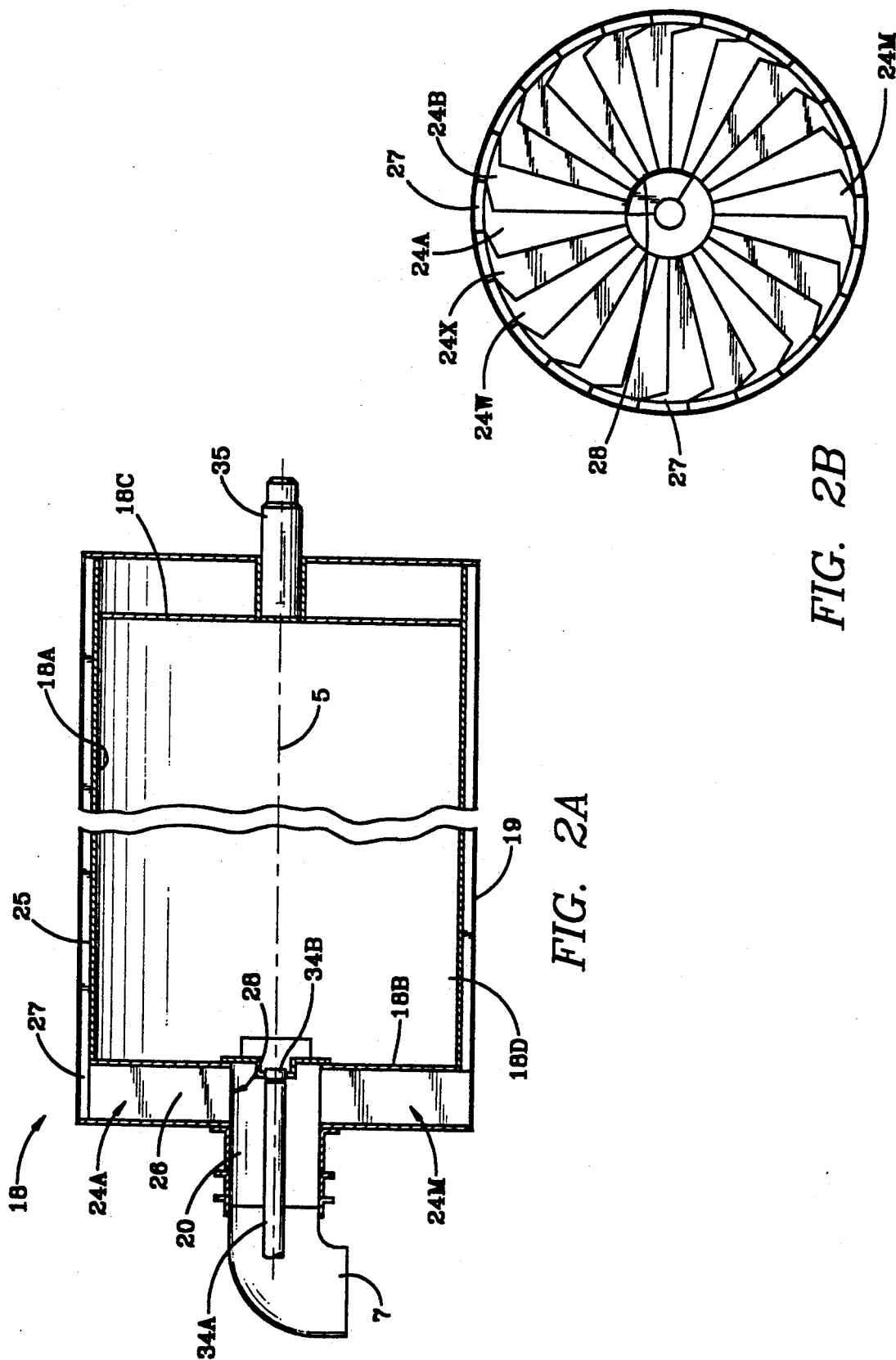
FIG. 2A is a cross-sectional view of the longitudinal of extent the cylinder structure of the first embodiment, taken along the in 2A—2A in FIG. 2.
Figure 3:
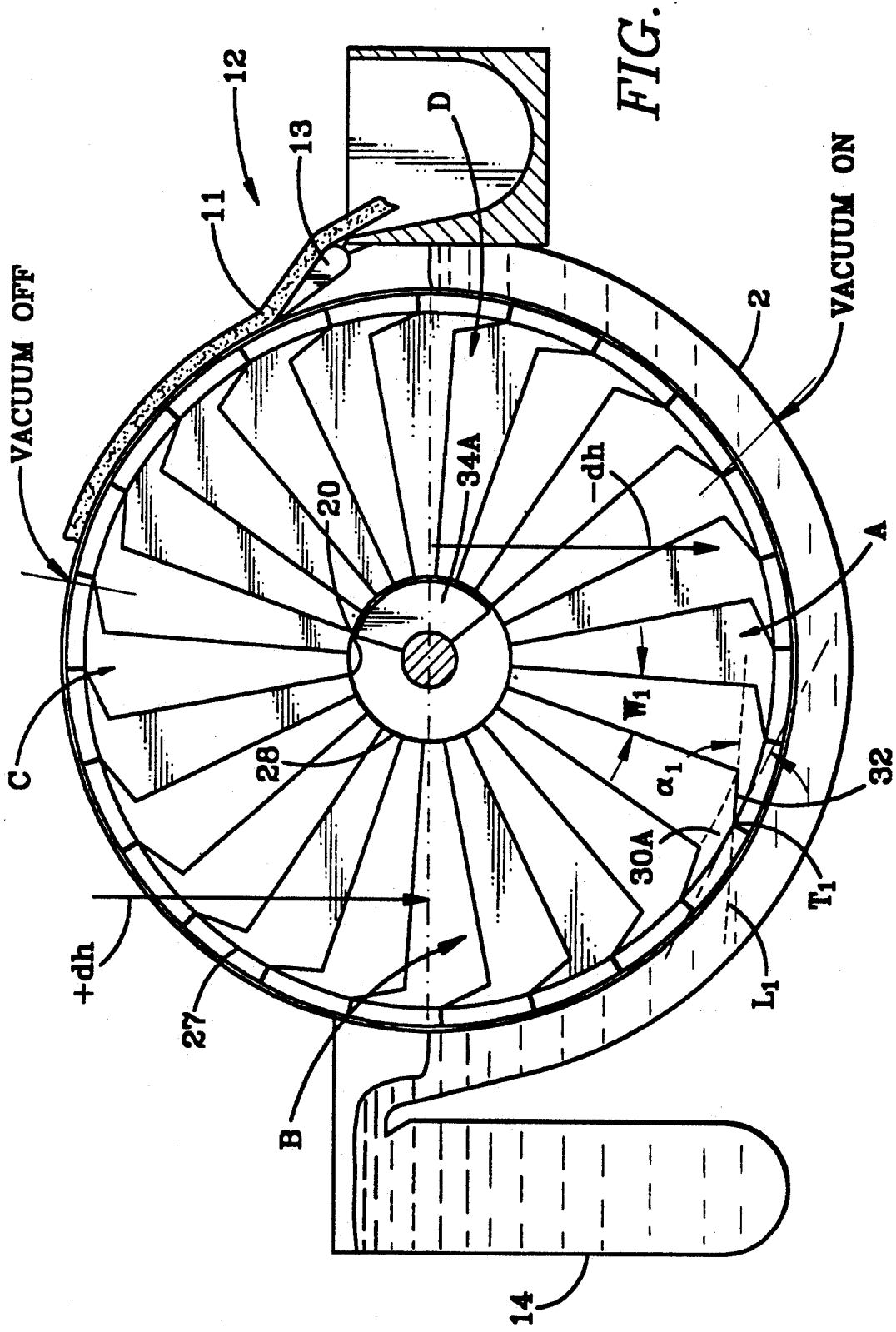
Figure 4:
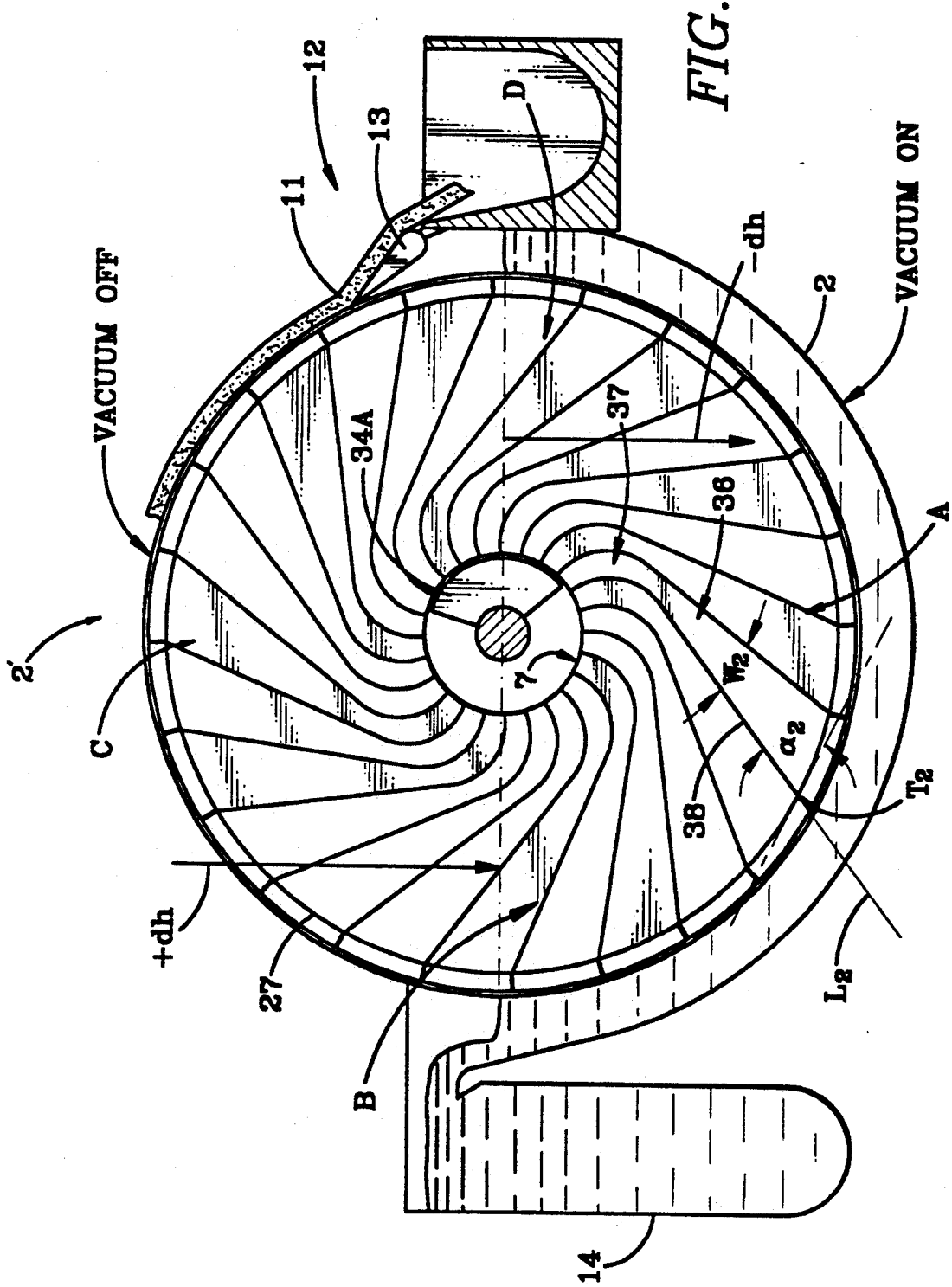
Figure 5:
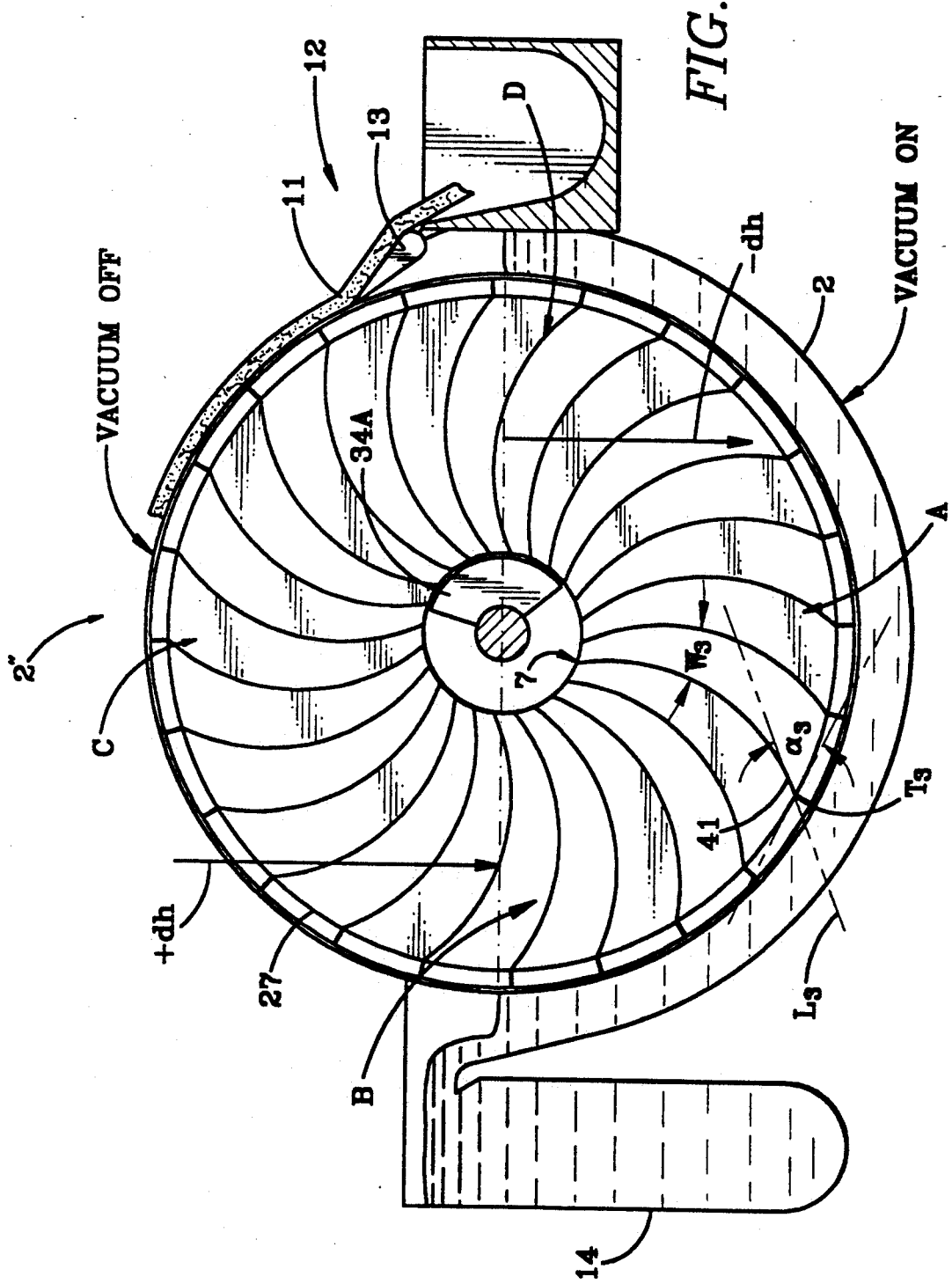

FIG. 2B is a cross-sectional view of the cylinder structure of the first embodiment, taken along line 2B—2B in FIG. 2, showing the plurality of filtrate conduits in the cylinder structure FIG. 3 is a cross-section view of the vacuum filtration system of the present invention, taken along line 3—3 in FIG. 1, showing the cylinder structure of the first illustrative embodiment installed for operation;

FIG. 4 is a cross sectional view of a second embodiment of the vacuum filtration system of the present invention, taken along line 3—3 in FIG. 1, showing the cylinder structure of the second illustrative embodiment installed for operation; and FIG. 5 is a cross sectional view of a third embodiment of the vacuum filtration system of the present invention, taken along line 3—3 in FIG. 1, showing the cylinder structure of the third illustrative embodiment installed for operation.

DETAILED DESCRIPTION

In FIG. 1, there is shown a preferred embodiment of the vacuum filtration system of the present invention. While the vacuum filtration system will be illustrated in connection with filtering wood pulp solids from pulp slurry during the manufacture of paper and paperboard, it will be appreciated that the system and components of the present invention will also find utility in the manufacture of felts for clothing, sewage treatment, and other arts requiring the practice of filtration processes.

As illustrated in FIG. 1, vacuum filtration system 1 comprises a number of system components, namely: an open vessel or vat 2 for containing a selected volume of pulp slurry; a cylinder structure 3 rotatably supported within the vessel in a horizontal position as shown; a cylinder drive mechanism 4, including a motor, gears and control equipment and instrumentation, for rotating the cylinder structure about its axis of rotation 5 in a predetermined rotational direction; a vacuum source 6, connected to a stationary vacuum tube 7, in order to impose a vacuum on the interior of the cylinder structure; water spraying station 8, including spray nozzles 9 and water pump 10, for applying water to a continuously formed pulp sheet 11 deposited on the outer filter surface of the cylinder structure; and a pulp sheet removal station 12, including a blade 13, for continuously removing the sheet of deposited pulp fibers after a desired amount of filtrate and water are removed therefrom. Although not shown, compression-type rollers are typically provided between the water spraying and pulp sheet removal stations in order to squeeze filtrate and water from the pulp sheet prior to its removal.

As illustrated in FIG. 1, a supply of "dilute stock" is maintained in a reservoir tank 14 which continuously feds dilute stock to vessel 2, preferably by a gravity feed mechanism. This arrangement enables the replenishment of dilute stock (i.e. filtrate) that has been suctioned through the cylinder structure by vacuum pump 6 during the pulp deposition and filtration process. The details of filtrate flow through the cylinder structure will be described in greater detail hereinafter. Filtrate suctioned by vacuum source 6 is pumped to a processing station 15 for recycling in an environmentally safe manner. The output of the processing station is clean water which is stored in reservoir 16, which in turn is pumped by water pump 10 to the spray nozzles at the water spraying station. It is understood that the above-described operations can be controlled using various fluid level and pressure sensors operably associated with a control computer in a manner well known in the pulp processing art.

As more clearly illustrated in FIGS. 2 through 2B, cylinder structure 2 of the first illustrative embodiment comprises a number of subcomponents assembled together as a unitary structure, namely: a cylindrical shell (i.e. drum) 18 having an outer wall surface 18A, end wall surfaces 18B and 18C, and a hollow fluid light interior volume 18D; a fluid pervious filter surface 19 supported by the outer wall surface of the cylindrical shell; a filtrate outlet (i.e. discharge) tube 20, and a collar portion 22 which extends outwardly beyond end wall 18B and bears a pair of circumferentially extending flanges 23A and 23B which function to create a vacuum seal with stationary vacuum tube 7; and twenty-four filtrate conduits 24A through 24X, each fixedly supported between filter surface 19 and the filtrate outlet tube 20. Preferably, cylindrical filter surface 19 is realized using a CORU-DEK ® filter construction, which is described in detail in U.S. Pat. No. 3,680,708, incorporated herein by reference.

As more clearly illustrated in FIGS. 2A and 2B, each filtrate conduit has a first conduit portion 25 connected to a second conduit portion 26 to form a unitary structure, as shown. As illustrated in FIG. 2, the first conduit portion 25 of each filtrate conduit has a filtrate inlet port 27 which extends along and beneath a longitudinal portion of filter surface 19 in direction which is substantially parallel to the longitudinal axis (i.e. axis of rotation) of the cylinder structure. The second conduit portion 26 of each filtrate conduit has a filtrate outlet port 28 draining to filtrate outlet tube 20. These filtrate conduits can be made from materials including stainless steel, fiberglass or any functionally equivalent material.

As shown in FIGS. 2 and 2A, the longitudinally extending filtrate inlet port 26 of the each filtrate conduit is disposed beneath cylinder shell 18 and is aligned with a longitudinally extending series of drainage openings in the filter surface. This way, the edges of each filtrate inlet port can be joined to underside of the cylinder shell in a sealed manner, as achieved by welding. Similarly, the filtrate outlet port of each filtrate conduit is joined to one of the apertures in the filtrate outlet tube, also in a sealed manner. Thus, when a vacuum is imposed on the filtrate outlet port 28 of any filtrate conduit, a pressure differential will result along the filter surface above the associated filtrate inlet port to induced filtrate flow thereacross. Notably, an essential feature of the present invention resides in the fact that the filtrate outlet port of each filtrate conduit is radially offset (i.e. spatially advanced) from its associated filtrate inlet port, that is, in the predetermined rotational direction of the cylinder structure. The functional advantages of this construction will be described in greater detail hereinafter.

Referring to FIGS. 1 and 2 in particular, the structural features of cylinder structure 2 are more clearly illustrated. As shown, the second conduit 26 portion is formed from a first trapezoidal-like subportion 30A which extends into a second trapezoidal-like subportion 30B. As illustrated in FIG. 3, the rear wall 32 of the first trapezoidal-like subportion is disposed at an acute angle $a_1$ formed between the tangent $T_1$ vector drawn to the filter surface at the intersection of rear wall 32 with the filter surface. As shown in FIG. 3, this subportion is joined to the second trapezoidal-like subportion 30B. The width $W_1$ of the second trapezoidal-like subportion tapers down in a linear manner as it extends from the first trapezoidal-like subportion to filtrate outlet port 28. The resulting geometry of each filtrate conduit provides a filtrate scooping action that induces a positive hydrodynamic (i.e. hydraulic) pressure differential at the filtrate inlet port, thus causing to filtrate to flow from the vessel towards the filtrate outlet port as the cylinder structure rotates in the predetermined rotational direction.

When the vacuum filtration system is assembled, a valve assembly 34, shown in FIGS. 2 and 2A, is fixedly mounted within the stationary vacuum tube. At the same time, the filtrate outlet tube of the cylinder structure is slidably disposed over the end portion of the stationary vacuum tube and is permitted to rotate thereabout with the provision of bearings and seals not shown. The second end of cylinder structure is supported by an axle 35 attached to end wall 18C of the cylinder shell along the axis of rotation. In turn, axle 35 is supported within a support (not shown) and driven by drive mechanism 4.

In the illustrated embodiment, valve assembly 34 comprises a shaft 34A which supports a valve member 34B against a series of filtrate outlet ports 28 draining to the filtrate outlet tube, to occlude a contiguous series of outlet ports 28, while the remainder of the ports are unoccluded. As illustrated clearly more in FIG. 2A, valve member 34B also seals off the interior end of the filtrate outlet tube. The actual construction of such valve assemblies is well known in the art and may vary from embodiment to embodiment without departing from the principles of the present invention.

The function of valve assembly 34 within the vacuum filtration system is to create a "vacuum activation region" and a "vacuum deactivation region" about the cylinder structure during its rotation. Over the vacuum activation region, the vacuum source is continuously connected to a first contiguous series of filtrate conduits as the cylinder structure rotates in the predetermined rotational direction. Over the vacuum de-activation region, the vacuum source is automatically occluded from a contiguous series of filtrate conduits as the cylinder structure rotates. As a result, there is always a series of filtrate conduits which are operably connected to the vacuum source, thus creating the stationary vacuum activation and deactivation regions about the filter surface while the cylinder structure rotates.

In FIG. 4, the structural and functional features of cylinder structure 2' of the second embodiment of the present invention are illustrated. In this embodiment, the primary difference resides in the geometrical characteristics of the second conduit portion of the filtrate conduits. Rather than having two discontinuous trapezoidal subportions connected together, as in the first embodiment of FIGS. 2 through 2B, the second conduit portion of is formed from first trapezoidal-like subportion 36 which extends into a second curved subportion 37. As shown, width $W_2$ of the trapezoidal-like portion tapers down in a linear manner from the filtrate inlet port towards the curved subportion 37 and is joined thereto in a unitary fashion. The rear wall 38 of each trapezoidal portion 36 is disposed at an acute angle $a_2$ formed between rear wall surface 38 and tangent vector $T_2$ drawn at the intersection of rear wall 38 and the filter surface. In this second embodiment of the present invention, the filtrate inlet port of each filtrate conduit is also radially offset (i.e. spatially advanced) from its associated filtrate outlet port in the predetermined rotational direction of the cylinder structure. As will be discussed in greater detail hereinafter, this feature ensures that filtrate within each filtrate conduit disposed below the filtrate level in the vessel, will experience a positive hydrodynamic pressure as the cylinder structural rotates in the predetermined rotational direction. In turn, this induces filtrate in each filtrate conduit below the selected level to flow from the vessel towards the vacuum tube, even when vacuum source is disconnected from the filtrate conduit by operation of the valve assembly.

In FIG. 5, a third embodiment of cylindrical structure 2" of the present invention is shown. In this embodiment, the geometrical characteristics of the second conduit portion of each filtrate conduit resembles the passageway of a nautilus. Specifically, the rear wall surface 40 of each second conduit portion adjacent the filtrate inlet port, is disposed at an acute angle $a_3$ formed between the slope line $L_3$ of rear wall surface 4 and the tangent vector $T_3$ drawn at the intersection of the slope line $L_3$ with the filter surface at the filtrate inlet port. Also as shown, the width $W_3$ of each nautilus-shaped conduit portion tapers down in a non-linear manner from the filtrate inlet port towards the filtrate outlet port. In this embodiment as well, the filtrate inlet port of each filtrate conduit is radially offset (i.e. spatially advanced) from its associated filtrate outlet port in the predetermined rotational direction. As in the other illustrative embodiments, this feature ensures that each filtrate conduit, disposed below the pulp slurry level in the vessel, will experience (i.e. be subjected to) a positive hydrodynamic pressure as the cylinder structure rotates in the predetermined rotational direction. This, in turn, induces the filtrate to flow from the vessel towards the vacuum tube, even when the vacuum source is disconnected from the filtrate conduit by operation of the valve assembly.

While the inlet and outlet filtrate ports in the various illustrative embodiments are each radially offset in the predetermined rotational direction, it is understood that (i) the degree of offset, i.e. advance, and (ii) the geometric characteristics of the second conduit portions of the filtrate conduit, will be chosen in each particular embodiment of the present invention to achieve two basic functions. Specifically, as the cylinder structure is rotated about its longitudinal axis at a suitable angular velocity, each filtrate conduit disposed below the selected level of pulp slurry in the vessel (1) "scoops up" filtrate like a paddle wheel, generating hydrodynamic pressure during the scooping action, and (2) holds a sufficient amount of filtrate to generate substantial levels of positive hydrostatic pressure at the filter surface when the filtrate is elevated above the slurry level in the tank.

It has been found that for any particular filtrate conduit construction of the present invention, the beginning of vacuum activation region, indicated by "VACUUM ON" in the drawings, is best selected to occur before the filtrate within each filtrate conduit experiences the maximum amount of negative hydrostatic pressure $-dh$ caused by gravity. As shown in the FIGS. 3, 4 and 5, this maximum hydrostatic pressure $-dh$ position is indicated by "A". The position at which the filtrate in each filtrate conduit experiences minimal negative hydrostatic pressure $-dh$, is indicated by "B" in FIGS. 3, 4, and 5. As illustrated in these drawings, the position at which the filtrate in each filtrate conduit experiences the maximum amount of positive hydrostatic pressure $+dh$ is indicated by "C" in the drawings. The position at which the vacuum activation region ends is indicated by "VACUUM OFF" in the drawings. As shown by the arrows in FIGS. 3, 4 and 5, the clockwise direction is the predetermined rotational direction of cylinders 2, 2' and 2", which is dictated by the orientation of the filtrate conduits.

Having described the structure and function of the various embodiments of the vacuum filtration system of the present invention, it is appropriate at this junction to now describe the operation thereof with reference to the first illustrative embodiment shown in FIG. 3.

In operation, the cylinder structure is rotated about longitudinal axis 5 by the cylinder drive mechanism, while the level of pulp slurry in the vessel is maintained to a level about half the height of the rotatably supported cylinder, referred to hereinafter as the "selected level". As each filtrate inlet port enters the pulp slurry at position "D", the associated filtrate inlet port is closed off from the vacuum tube by operation of the stationary control valve 34B. While rotating from position "D" to position "VACUUM ON", filtrate is permitted to flow through the filtrate conduits up to the selected level as shown. While moving through the pulp slurry over this vacuum deactivation region, hydrodynamic pressure is exerted on the column of filtrate in the filtrate conduits disposed below the selected level. Then, at position VACUUM ON, the filtrate outlet port and thus the associated filter inlet port are operably connected to vacuum source 6 by operation of the control valve. At position A, the column of filtrate within the filtrate conduit experiences the greatest negative hydrostatic pressure $-dh$ and, at this position, both (i) the hydrostatic pressure generated by the radially offset filtrate ports and conduit and (ii) the vacuum pressure supplied to the filtrate conduit by the vacuum source cooperate to efficiently draw filtrate through filter surface 19, its associated filtrate inlet port and conduit, and into the stationary vacuum tube, while a layer of pulp fiber is gradually deposited on the filter surface. This process occurs sequentially for each filtrate conduit moving from position D to the VACUUM ON position.

Then, as the cylinder structure rotates in its predetermined rotational direction at constant angular velocity, several events occur: each filtrate conduit advances from position A to position B; the negative hydrostatic pressure $-dh$ created by the gravitational force decreases; while the hydrodynamic pressure created by the rotating cylinder increases. This effectively increases the combined vacuum and hydrodynamic pressure at the filtrate inlet ports, thereby facilitating an increased build up of pulp fibers to form a more uniform sheet of pulp.

As each filled filtrate conduit moves from position B to above the selected level, the column of filtrate within the filtrate conduit creates a positive hydrostatic pressure +dh upon the filtrate column, thereby effectively increasing the combined vacuum and hydrostatic pressure presented at the filter surface. This tends to enhance the removal of filtrate and water which is applied to the pulp sheet at the water spraying station.

As each filtrate conduit advances from position B towards position C, the positive hydrostatic pressure +dh increases until it reaches its maximum value at position C. At this stage of the process, the pulp sheet is the thickest, thus presenting the greatest pressure drop at the filter surface. However, the combined vacuum and positive hydrostatic pressure +dh at this position provides the necessary level of pressure differential at the filter surface to effect sufficient removal of filtrate and water prior to removing the formed pulp sheet at the pulp sheet removal station. At a subsequent position beyond position C where most filtrate and water has been removed from the pulp sheet, vacuum pressure is disconnected from each filtrate conduit over the vacuum deactivation region.

The above described filtration and pulp washing process occurs in a similar manner for each of the alternative embodiments of the present invention.

Having described the invention, what is claimed is:

1. A vacuum filtration system for filtering dispersed solids from liquid filtrate in a liquid suspension, comprising: elements including,
   a vessel for retaining a desired volume of said liquid suspension, said desired volume of liquid suspension filling said vessel up to a selected level;
   a cylindrical structure having an interior volume and a longitudinal axis and being supported within said vessel for rotation about said longitudinal axis in a predetermined rotational direction; and
   a stationary vacuum tube disposed along said longitudinal axis and being operably associable with a vacuum source;
   said cylinder structure further including:
   (i) a filter surface pervious to said filtrate and substantially impervious to said dispersed solids,
   (ii) a filtrate outlet tube disposed along said longitudinal axis, and
   (iii) a plurality of filtrate conduits, each having first and second conduit portions, each said first conduit portion having a filtrate inlet port extending beneath and along a portion of said filter surface in a direction substantially parallel to said longitudinal axis, and each said second conduit portion being operably connected with one said first conduit portion and having a filtrate outlet port operably connected to said filtrate outlet tube, and said filtrate outlet port of each said filtrate conduit being radially offset from said associated filtrate inlet port in said predetermined rotational direction so that, as said cylinder structure rotates in said predetermined rotational direction and said vacuum source is operably connected to said vacuum tube, filtrate from said vessel is suctioned through said filter surface and along at least a selected number of said filtrate conduits and thence through said filtrate outlet port, and dispersed solids are suctioned against said filter surface to form a sheet of said dispersed solids on said filter surface;
   said elements being sized, spaced and dimensioned, such that, as said cylinder structure rotates, each said filtrate conduit below said selected level within said vacuum activation region fills with filtrate, and said filtrate is subjected to hydraulic pressure which cooperates with the vacuum pressure supplied to said filtrate conduits so as to induce the flow of filtrate into said filtrate conduits; and
   each said filtrate conduit emerging above said selected level is filled with filtrate, and said filtrate is subjected to hydrostatic pressure which cooperates with the vacuum pressure supplied to said emerged filtrate conduits so as to induce the flow of filtrate into said filtrate conduits.

2. The vacuum filtration system of claim 1, wherein said cylinder structure further includes a cylindrical shell portion having an enclosed interior volume, a first end portion, and a second end portion, and wherein said second conduit portion of each said filtrate conduit is disposed at said first end portion.

3. The vacuum filtration system of claim 2, wherein a first contiguous group of said filtrate outlet ports are operably connected with said stationary vacuum tube so that, as said cylinder structure rotates in said predetermined rotational direction, a first contiguous group of said filtrate inlet ports associated with said first contiguous group of said filtrate outlet ports are operably connected to said vacuum tube and thereby supplied with vacuum pressure so as to establish a vacuum activation region stationarily located about said cylinder structure, while the remainder of said filtrate inlet ports are operably disconnected from said vacuum source so as to provide a vacuum deactivation region stationarily located about said cylinder structure.

4. The vacuum filtration system of claim 2, which further comprises said vacuum source.

5. The vacuum filtration system of claim 4, which further comprises means for rotating said cylinder structure in said predetermined rotational direction.

6. The vacuum filtration system of claim 1, which further comprises said vacuum source, and means for rotating said cylinder structure.

7. The vacuum filtration system of claim 6, which further comprises means for applying water to said sheet after said sheet emerges from above said selected level.

8. The filtration system of claim 7, which further comprises means for continuously removing said sheet at a location within said vacuum deactivation region.

9. A cylindrical structure having an interior volume and a longitudinal axis and being supportable within a vessel, for rotation about said longitudinal axis in a predetermined rotational direction, said vessel containing a selected level of liquid suspension having solids dispersed in liquid filtrate, said cylinder structure comprising: elements including,
   a filter surface pervious to said filtrate and substantially impervious to said dispersed solids;
   a filtrate outlet tube disposed along said longitudinal axis; and
   a plurality of filtrate conduits, each said filtrate conduit having first and second conduit portions, each said first conduit portion having a filtrate inlet port extending beneath and along a portion of said filter surface in a direction substantially parallel to said longitudinal axis, and each said second conduit portion being operably connected with one said first conduit portion and having a filtrate outlet port operably connected to said filtrate outlet tube, and said filtrate outlet port of each said filtrate conduit being radially offset from said associated filtrate inlet port in said predetermined rotational direction so that, as said cylinder structure rotates in said predetermined rotational direction and a vacuum source is operably connected to said filtrate outlet tube, filtrate from said vessel is suctioned through said filter surface and along at least a selected number of said filtrate conduits and thence through said filtrate outlet port, and dispersed solids are suctioned against said filter surface to form a sheet of said dispersed solids on said filter surface;

said elements being sized, spaced and dimensioned, such that, as said cylinder structure rotates, each said filtrate conduit below said selected level within said vacuum activation region fills with filtrate, and said filtrate is subjected to hydraulic pressure which cooperates with the vacuum pressure supplied to said filtrate conduits so as to induce the flow of filtrate into said filtrate conduits; and each said filtrate conduit emerging above said selected level is filled with filtrate, and said filtrate is subjected to hydrostatic pressure which cooperates with the vacuum pressure supplied to said emerged filtrate conduits so as to induce the flow of filtrate into said filtrate conduits.

10. The said cylinder structure of claim 9 which further comprises a cylindrical shell portion having an enclosed interior volume, a first end portion, and a second end portion, and wherein said second conduit portion of each said filtrate conduit is disposed at said first end portion.

11. The cylinder structure of claim 10, which further comprises valve means operably associated with said filtrate outlet port, for operably connecting a first contiguous group of said filtrate outlet ports to said vacuum source so that, as said cylinder structure rotates in said predetermined rotational direction, a first contiguous group of said filtrate inlet ports associated with said first contiguous group of filtrate outlet ports are operably connected to said vacuum source and thereby supplied with vacuum pressure so as to establish a vacuum activation region stationarily located about said cylinder structure, while the remainder of said filtrate inlet ports are operably disconnected from said vacuum source so as to provide a vacuum deactivation region stationarily located about said cylinder structure.

12. A method of filtering pulp fibers from a liquid filtrate contained in pulp slurry, said method comprising the steps:

(a) installing a stationary vacuum tube along a reference axis;

(b) connecting an activatable vacuum source to said stationary vacuum tube;

(c) supporting a cylindrical structure within at least a portion of a vessel, for rotation in predetermined rotational direction about said reference axis, said cylinder structure having an interior volume and elements including:

(i) a filter surface pervious to said filtrate and substantially impervious to said pulp fibers, (ii) a filtrate outlet tube disposed along said longitudinal axis, and (iii) a plurality of filtrate conduits, each said filtrate conduit having first and second conduit portions, each said first conduit portion having a filtrate inlet port extending beneath and along a portion of said filter surface in a direction substantially parallel to said longitudinal axis, and each said second conduit portion being operably connected with one said first conduit portion and having a filtrate outlet port operably connected to said filtrate outlet tube, and said filtrate outlet port of each said filtrate conduit being radially offset from said associated filtrate inlet port in said predetermined rotational direction;

(d) maintaining a desired volume of pulp slurry in said vessel so that said pulp slurry fills said vessel up to a selected level; and (e) activating said vacuum source and rotating said cylindrical structure about said reference axis in said predetermined rotational direction, whereby filtrate from said vessel is suctioned through said filter surface and along at least a selected number of said filtrate conduits and thence through said vacuum outlet port, and pulp fibers are suctioned against said filter surface to form a sheet of said dispersed solids on said filter surface;

sizing, spacing and dimensioning said elements such that, as said cylindrical structure rotates each said filtrate conduit below said selected level within said vacuum activation region fills with filtrate, and said filtrate is subjected to hydraulic pressure which cooperates with the vacuum pressure supplied to said filtrate conduits so as to induce the flow of filtrate from said vessel into said filtrate conduits; and each said filtrate conduit emerging above said selected level is filled with filtrate, and said filtrate is subjected to hydrostatic pressure which cooperates with the vacuum pressure supplied to said emerged filtrate conduits so as to induce the flow of filtrate from said vessel into said filtrate conduits.

13. The method of claim 12, wherein step (c), said cylinder structure further includes a cylindrical shell portion having an enclosed interior volume, a first end portion, and a second end portion, and wherein said second conduit portion of each said filtrate conduit is disposed at said first end portion.

14. The method of claim 13, wherein step (c) further comprises operably connecting a first contiguous group of said filtrate outlet ports with said stationary vacuum tube so that, as said cylinder structure rotates in said predetermined rotational direction, a first contiguous group of said filtrate inlet ports associated with said first contiguous group of said filtrate outlet ports are operably connected to said vacuum tube and thereby supplied with vacuum pressure so as to establish a vacuum activation region stationarily located about said cylinder structure, while the remainder of said filtrate inlet ports are operably disconnected from said vacuum source so as to provide a vacuum deactivation region stationarily located about said cylinder structure.

* * * * *